Jan. 20, 1959  H. J. MODREY  2,869,794
DISPOSAL-DRIVEN POT SCOURING DEVICE
Filed April 3, 1957

INVENTOR.
HENRY J. MODREY
BY Hane and Nydick
ATTORNEYS

United States Patent Office 2,869,794
Patented Jan. 20, 1959

2,869,794

DISPOSAL-DRIVEN POT SCOURING DEVICE

Henry J. Modrey, Stamford, Conn.

Application April 3, 1957, Serial No. 650,404

12 Claims. (Cl. 241—101)

The present invention relates to a power driven scouring device, and more particularly to a power driven scouring device installed in a sink especially a kitchen sink.

While china, glassware and flatware can be efficiently cleaned and dried in a dishwasher the cleaning of cooking utensils and more generally the removal of adhering and comparatively hard food residue is still a tiresome and unpleasant manual operation.

In my prior Patent 2,579,393 I have disclosed a power driven scouring device which is mounted in a kitchen sink and drains into the drain pipe of the sink. The device of the patent facilitates the aforementioned scouring operations, but has certain limitations in that the rotary scouring head of the device is at a fixed height relative to the sink. The fixed position of the scouring head is sometimes inconvenient due to the widely varying sizes and shapes of the cooking utensils or other utensils to be scoured.

The present invention carries forward the basic concept of my prior patent.

One object of the present invention is to provide a novel and improved power driven scouring device of the general kind above referred to, the rotary scouring head of which is elastically displaceable in height relative to the bottom of the sink. This affords the advantage that the scouring head will adjust itself automatically to the depth of a utensil such as a pot to be scoured, and also within limits to the height of the user. Furthermore, the axial elasticity of the head mount assists in maintaining the required scouring pressure.

As stated in my prior Patent 2,579,393, the essential concept of my earlier invention was the use of the inverted pot or pan as a spatter shield. Only by confining the spattering of dirt, water and food residue into the sink, power scouring becomes a practical possibility inside the kitchen.

The automatic height adjustment afforded by the telescopic action of the device described herein, serves to adjust this spatter shield to the most effective position in conformity with the size of the utensil. It will be obvious that cleaning of a skillet with shallow side walls requires deeper insertion into the sink to prevent scattering than a pot with deep sidewalls.

Another object of the invention is to provide a power driven scouring device the rotary scouring head of which is automatically started and stopped by applying and releasing respectively a downward pressure upon the head by means of the inverted pot or pan. Such an arrangement obviates the necessity of frequently manipulating a switch for the purpose thereby facilitating the operation of the device. Its main purpose is to prevent a throw-off of cleaning fluid and cleanser material which may occur when a scoured utensil is removed while the head is still spinning, and also to prevent injury to the hands of the operator.

Still another object of the invention is to provide a power driven scouring device which supplies water and cleansing material during a scouring operation.

A further object of the invention is to provide a power driven scouring device which is designed to be driven by the motor of a garbage disposal unit installed underneath a domestic or commercial sink in communication with a drainage opening of the sink. Such use of an available disposal unit instead of a special drive simplifies the installation, reduces the costs of the device very considerably, and assists in the removal of the dirt resulting from the scouring operation.

A still further object of the invention is to provide a power driven scouring device which can be drivingly connected to the drive shaft of the disposal unit motor and disconnected therefrom without requiring the use of tools or mechanical skill.

Yet another object of the invention is to provide a power driven scouring device the coupling mechanism of which includes an adapter part which is permanently mounted on the drive shaft end of the disposal unit facing the sink drain and a part mounted on the scouring device proper which latter part is drivingly connectable to the adapter by simply slipping it upon the same and detachable from the adapter by pulling it off. As the adapter part replaces the terminal unit which is customarily affixed to the upper end of the drive shaft of disposal units, this affords the advantage that the installation of the scouring device does not interfere with the normal operation of the disposal unit and in most instances can be effected in situ without dismantling the disposal unit.

Other and further objects, features and advantages of the invention will be pointed out hereinafter and set forth in the appended claims forming part of the application.

In the accompanying drawing several preferred embodiments of the invention are shown by way of illustration and not by way of limitation.

Referring now to the figures in detail.

Figure 1:
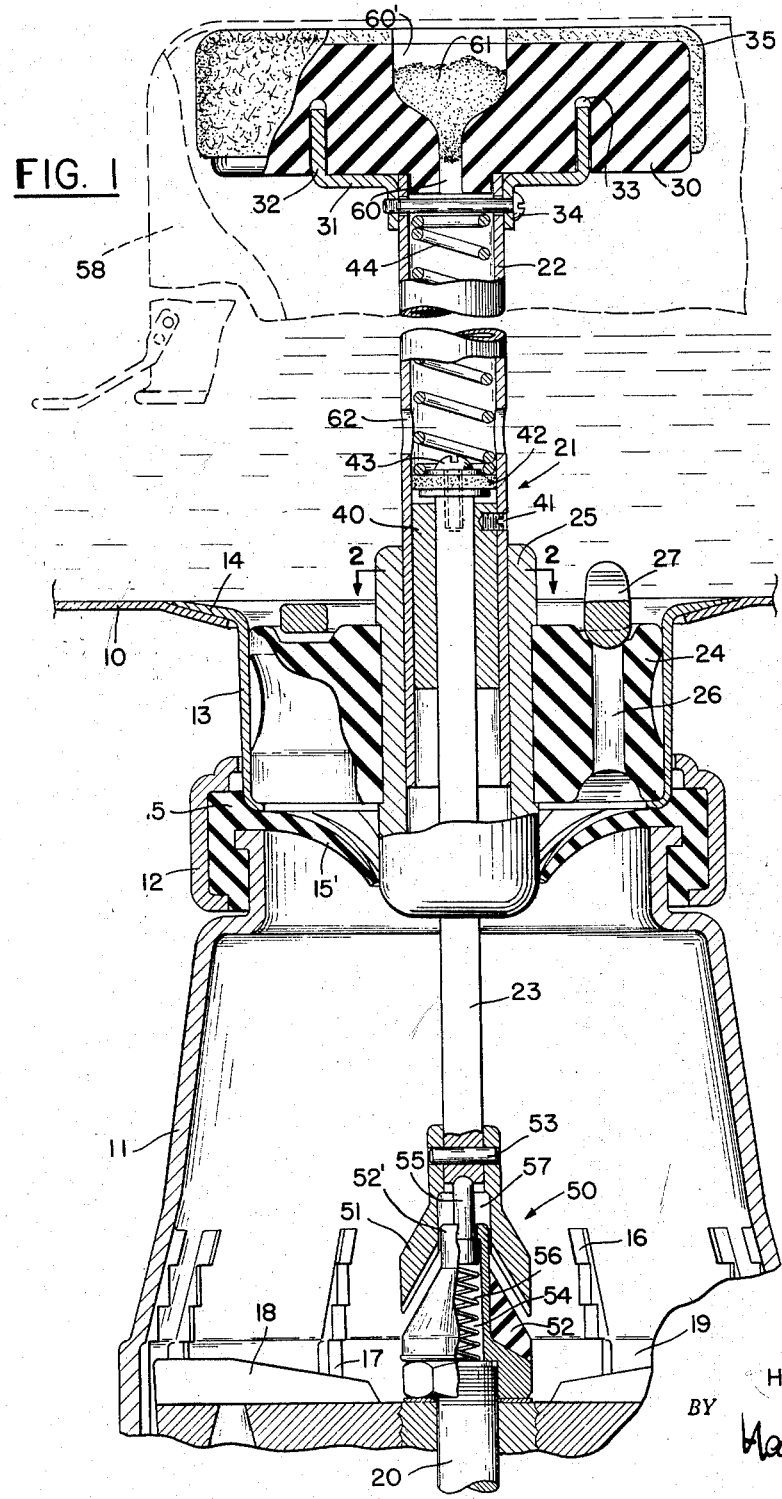
Fig. 1 is a sectional elevational view of a scouring device according to the invention attached to a garbage disposal unit mounted beneath the drainage opening of a sink.

Fig. 1 shows part of the bottom 10 of a kitchen sink beneath which is installed a garbage disposal unit which does not constitute part of the invention. The unit should be visualized as being of conventional design and only those parts of the unit are shown, that have a bearing upon the operation of the device of the invention, partly in simplified form.

The housing 11 of the disposal unit is mounted beneath the sink and suspended from the bottom thereof by means of a ring 12 and a cup shaped member 13 the downwardly turned flange 14 of which overlies the rim of the sink opening. A rubber ring 15 is interposed between ring 12 and cup 13. This ring has inwardly extending elastic fingers 15' to form a self-closing drain cover. Housing 11 is shown as having on its inner wall several rows of shredder teeth 16 which coact with the teeth 17 and knives 18 of shredder ring 19 which is seated upon the drive shaft 20 of the motor of the unit (not shown). The components heretofore described are all conventional and do not constitute part of the invention.

Figure 3:
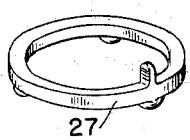
Fig. 3 is a perspective view of one of the components of the device on a reduced scale.
Figure 2:
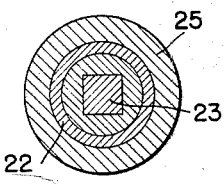
Fig. 2 is a section taken on line 2—2 of Fig. 1.

Turning now to the scouring device according to the invention, this device comprises a drive shaft generally designated by 21. The shaft is formed of a tubular part 22 and a rod 23 extending into tube 22. Tube 22 is rotatably mounted in a plug 24 made of rubber or other suitable material and firmly inserted into drainage cup 13. While tube 22 may rotate directly within the plug it is generally preferable and also shown to interpose a bearing tube 25 made for instance of brass which is affixed to plug 24 by bonding, keying, or a stretch fit. The bottom end of tube 25 displaces fingers 15' of drain cover 15 when the drain is inserted. To permit draining of the sink when plug 24 is placed in cup 13, circumferentially spaced drain holes 26 are provided which may be closed by turning a closure ring 27 which is best shown in Fig. 3.

Tube part 22 of the drive shaft mounts the scouring head proper which is shown by way of example as comprising a rubber body 30. Body 30 is carried by a support member 31 with upwardly turned arms 32 engaging into corresponding slots 33 of scouring head 30. Support member 31 is fastened to tube 22 by any suitable means, shown as a screw 34. The outer surface of scouring head 30 may be finished to serve as scouring surface by providing a special covering 35 which has a suitably roughened or abrasive finish. While a scouring head of generally disc shape is shown, it is evident that scouring heads of other configuration may be also provided and are attached by slipping upon arms 32. For instance, a head in the form of a suitable brush carrying bristles in a wooden or elastic body, may be provided.

The rod part 23 of drive shaft 21, as previously mentioned, is telescoped into tube 22 and axially guided therein by means of a guide sleeve 40 which in turn is secured to tube 22 by any suitable means shown as screw 41. To transmit rotation from rod 23 to tube 22 and the scouring head mounted thereon, the two parts are keyed together by the square or otherwise non-round cross-section of rod 23 and the correspondingly shaped bore through guide sleeve 40. The keying together of the two extensible parts of the drive mechanism can be achieved by other conventional means such as a cross-pin affixed to one part in conjunction wtih an axial slot in the other part.

Rod 23 mounts at its upper end a disc 42 secured to the end face of rod 23 by any suitable means shown as a screw 43. Disc 42 constitutes a piston within the cylinder formed by tube 22 for a purpose which will be more fully explained hereinafter. Disc 42 also serves as an abutment for one end of a loaded coil spring 44 abutting with its other end against screw 34. This spring urges parts 22 and 23 into a position of maximum axial extension, or in other words, urges the scouring head toward its position of maximum height above sink bottom 10.

Drive rod 23 is connected to drive shaft 20 of the disposal unit by means of a self-releasing coupling or clutch 50. This clutch is shown as having two clutch members 51 and 52. Clutch member 51 is secured to rod 23 by any suitable means shown as a cross pin or rolled pin 53 so that it becomes in effect part of rod 23. Clutch member 52 is permanently secured to drive shaft 20 for rotating in unison therewith. An axial bore 54 of member 52 houses at its upper shouldered or flanged end a pin 55 which by a spring 56 also housed in bore 54, is urged into the uppermost position shown in Fig. 1. In this position the pin yieldably presses against the face end of rod 23 or a suitable portion of member 51 so as to urge the two clutch members into the disengaged position shown in Fig. 1. The two coupling members coact with each other by the engagement of suitably shaped frictional surfaces. Clutch member 51 has an axial bore 57 which slidably receives the upper cylindrical portion 52' of clutch member 52 to hold the clutch members in alignment and also drive shafts 20 and 21.

The scouring device further comprises a pump means to feed water and if desired cleansing material to the upper side of the scouring head to facilitate scouring of a pot 58 or other utensil shown in phantom. For this purpose the scouring head has an axial bore 60 which is preferably widened at its upper end to form a receptacle-like cavity 60' for storing therein a supply of cleansing material 61. Bore 60 communicates with tubular shaft part 22 which forms together with piston disc 42 a pump into which water may enter from the sink through one or several circumferentially spaced inlet ports 62.

As is apparent, all the components of the scouring device except clutch member 52 and the parts directly associated therewith can be lifted as an assembly out of the sink and removed from the disposal unit. Pull at the device lifts plug 24 out of drainage cup 13 and clutch part 51 out of the cylindrical portion 52' of clutch member 52. After removal of the scouring device the sink and the disposal unit can be operated in the usual manner without the necessity of mounting or demounting any parts thereof, clutch member 52 taking the place of the locking nut normally used instead of the clutch member. To reinsert the scouring device, plug 24 is simply pushed into cup 13. Pin 55 in cooperation with the conical inside of clutch number 51 will act as a guide for correct insertion of the scouring device. Clutch part 51 will automatically locate itself.

As the distance from the upper end of drive shaft 20 to the bottom of drainage cup 13 is apt to vary in different brands of disposal units, several longitudinally spaced holes in rod 23 may be provided for pin 53 so that the effective length of rod 23 can be easily changed, as required.

The scouring device according to the invention as hereinbefore described operates as follows:

Let it be assumed that the scouring device is inserted as shown, that drain closure ring 27 is in position to accumulate a quantity of water in the sink sufficient to cover pump inlet ports 62 and that the disposal unit is running. The scouring head will remain at rest as the clutch parts are separated by the action of spring 56.

To start the scouring operation the user exerts a downward pressure upon the scouring head preferably through the bottom of pot 58, by pressing the pot downwards. Such downward pressure will move the entire drive shaft assembly downwardly within guide sleeve 25 and hence the clutch parts into engagement, it being assumed that spring 56 is considerably weaker than spring 44 so that the latter spring in effect acts as a rigid part. The scouring head now begins to spin with the rotational speed of shaft 20. As soon as the downward pressure is relaxed by removal of the pot, spring 56 through pin 55 will again separate the two clutch parts so that the scouring head comes to a standstill.

When a downward pressure is applied to the scouring head stronger than the pressure required to move the clutch parts into engagement, shaft part 22 and guide sleeve 40 slide downwardly in bearing sleeve 25 relative to rod 23 and piston 52 which have become axially stationary by engagement of the clutch parts. As soon as the downward pressure is relaxed, spring 44 first returns shaft part 22 and with it the scouring head into the illustrated position and finally clutch parts 51 and 52 become disengaged. As is apparent, the telescopic displacement of shaft parts 21 and 22 by pressure beyond the pressure required to start the scouring head effects a convenient adjustment of the axial height of the scouring head to the varying positions and sizes of a utensil being scoured and also to the height most convenient to the user.

In the event it is desired to pump water and cleansing material during a scouring operation the scouring head is momentarily depressed and released. Upon depression of the scouring head so that piston 42 is above the upper level of inlet ports 62, the column of water in tubular shaft part 22 is lifted into the illustrated position, or at least into a position uncovering inlet ports 62, the tube part or pump cylinder 22 is charged with a new column of water so that any desired quantity of water and cleansing material can be pumped by repeated momentary depression of the scouring head.

This arrangement furnishes water and cleanser on demand only and is preferable to arrangements which would furnish a constant stream of water such as for example an Archimedian screw driven by rod 23 and rotating inside tube 22, because a constant flow of water could be very wasteful of cleansing material.

If it is desired to drain the sink either during or after a scouring operation closure ring 27 is turned into the position in which drain holes 26 are uncovered.

Figure 4:
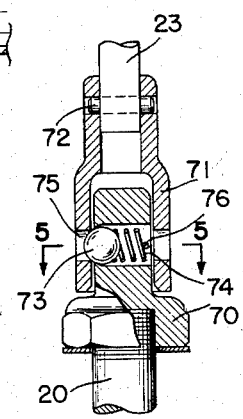
Fig. 4 is a fragmentary sectional view of a modification of the coupling mechanism of the device.
Figure 5:
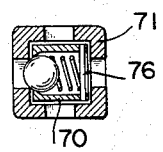
Fig. 5 is a section taken on line 5—5 of Fig. 4.

Referring now to Figs. 4 and 5, these figures show a coupling arrangement between rod 23 and motor shaft 20 which joins these two parts in driving connection as long as the scouring device is installed. According to this figure, the connector comprises a member 70 permanently attached to disposal drive shaft 20 for rotation in unison therewith, and a second member 71 fastened to rod 23 for instance by means of a cross-pin 72. Member 71 has a square or otherwise unround cross-section which is engaged by a correspondingly shaped extension of member 70 so that the rotation of shaft 20 will be transmitted to rod 23 and through it to the scouring head when the two members 70 and 71 are in engagement. Connector member 71 is releasably retained in connector member 70 by any suitable means shown as a ball 73 urged by a spring 74 into a hole 75 in the wall of member 71. The diameter of hole 75 is less than the diameter of ball 73 to limit the penetration of the ball into the hole. Spring 74 is held in position by a pin 76.

As is apparent, connector member 71 can be pushed upon connector member 70 by forcing the ball out of engagement with hole 75 and can also be withdrawn from connector member 70 by overcoming the pressure of spring 74 upon ball 73.

The function of a scouring device equipped with the connector of Figs. 4 and 5 will be evident from the previous description.

The only difference between the devices of Fig. 1 and Fig. 4 is the fact that the latter device does not come automatically to a standstill when the cooking utensil is lifted from the scouring head. Both devices, however, have the identical feature of automatic height adjustment which places the spattershield formed by the cooking utensil, into the requisite position inside the sink.

While the invention has been described in detail with respect to certain now preferred examples and embodiments of the invention it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent, is:

1. A self-contained scouring device in the form of an attachment for a power driven garbage disposal unit of the kind mounted beneath the drain of a kitchen sink, said device comprising a drive shaft having two parts slidably telescoped into each other and secured against rotation relative to each other, a support structure supporting one of said shaft parts rotatable and axially slidable relative to said structure, a scouring head mounted on the free outer end of said one shaft part for rotation in unison therewith, the other shaft part being adapted to be drivingly coupled to said disposal unit for joint rotation of the shaft parts, and a spring biasing the two shaft parts toward a position of maximum axial extension.

2. A self-contained scouring device adapted for driving engagement with the motor of a power driven garbage disposal unit of the kind mounted beneath the drain of a kitchen sink, said device comprising a drive shaft having two parts slidably telescoped into each other and secured against rotation relative to each other, a support structure supporting one of said shaft parts rotatable and axially slidable relative to said structure, a scouring head mounted on the free outer end of said one shaft part for rotation in unison therewith, a spring means within said one shaft part biasing the two shaft parts toward a position of maximum axial extension, and a two-part friction clutch, one part of said clutch being secured to the free outer end of the other part of the drive shaft and the other clutch part constituting an adapter adapted for coupling said other shaft part of the device to the disposal unit motor, said clutch parts being frictionally engageable by axial displacement of said other shaft part, and yieldable means urging the two clutch parts into a disengaged position.

3. A scouring device according to claim 2, wherein one of said clutch parts includes a receiving bore slideably engageable by the second clutch part, and wherein a loaded pin holds the engageable portions of the clutch parts in positions separated from each other.

4. A scouring device according to claim 2, wherein said spring means between the drive shaft parts of the device is heavier than said yieldable means so that said clutch parts become engaged prior to a telescopic shortening of the drive shaft of the device in response to an axial displacement of the shaft parts toward said second clutch part.

5. A self-contained scouring device in the form of an attachment for a power driven garbage disposal unit of the kind mounted beneath the drain of a kitchen sink, said device comprising a drive shaft having two parts slidably telescoped into each other and secured against rotation relative to each other, one of said telescoped shaft parts being adapted to be power driven for joint rotation of the shaft parts, a support structure supporting the other one of said shaft parts rotatable and axially slidable relative to said structure, a scouring head mounted on the free outer end of said other shaft part for rotation in unison therewith, and a spring within said other shaft part biasing the two shaft parts toward a position of maximum axial extension, one of said shaft parts being tubular to form a pump cylinder and the other forming a piston slideable in said cylinder, said cylinder having in its wall a liquid inlet port, and said scouring head having a liquid outlet port communicating with said cylinder whereby, upon reciprocating relative movements of the cylinder and the piston, liquid admitted into the cylinder through said inlet port is discharged through said outlet port.

6. A scouring device according to claim 5, wherein said tubular shaft part mounts said scouring head and said spring is disposed in said pump cylinder forming shaft part, said spring abutting against the head and the piston forming shaft part respectively for urging the two parts into the relative position of maximum axial extension.

7. A scouring device according to claim 5, wherein said scouring head includes an axial bore communicating at one end with said pump cylinder and enlarged at the other end to form a receptacle for cleansing material, said bore and receptacle constituting said liquid outlet port.

8. A scouring assembly comprising, in combination, a power driven garbage disposal device adapted to be attached to a sink for coaction with the drain thereof, said device including a motor having a drive shaft; and a scouring device, said scouring device comprising a drive shaft having two parts slidably telescoped into each other and secured against rotation relative to each other, a scouring head mounted on the free outer end of one part of the drive shaft of the scouring device for rotation in unison with the shaft, a spring within said one shaft part biasing the two shaft parts toward a position of maximum axial extension, a support structure supporting said one shaft part rotatable and axially slidable, said support structure fitting the drain of the sink to close the same, and a two-part clutch, one of the clutch parts being secured to the other shaft part of the drive shaft of the scouring device and the other clutch part being attached to the drive shaft of the disposal device, said two clutch parts being adapted to receive one the other in rotation transmitting engagement.

9. A scouring assembly according to claim 8, wherein said drive shaft part mounting the scouring head is tubular to form a pump cylinder and the other of said two parts constitutes a piston slideable in said cylinder, the part forming said cylinder having in its wall an inlet port for liquid and said scouring head including an outlet port communicating with said cylinder whereby upon reciprocation of said two drive shaft parts liquid entering the cylinder through said inlet port is discharged through said outlet port.

10. A scouring assembly according to claim 9, wherein said scouring head includes an axial bore communicating at one end with said cylinder forming drive shaft part and enlarged at the other end to form a receptacle for cleansing material, said bore and receptacle constituting said liquid outlet port.

11. A scouring assembly comprising, in combination, a power driven garbage disposal device adapted to be attached to a sink for coaction with the drain thereof, said device including a motor having a drive shaft; and a scouring device, said scouring device comprising a drive shaft having two parts slidably telescoped into each other and secured against rotation relative to each other, a scouring head mounted on the free outer end of one part of the drive shaft of the scouring device for rotation in unison with said shaft part, a spring means within said one shaft part biasing the two shaft parts toward a position of maximum axial extension, a support structure supporting said one shaft part rotatable and axially displaceable, said support structure fitting the drain of the sink to close the same, a two-part clutch, one of the clutch parts being secured to the other shaft part of the drive shaft of the scouring device and the other clutch part being attached to the drive shaft of the disposal device, said two clutch parts being adapted to receive one the other in rotation transmitting engagement by axial displacement of said other shaft part toward said other clutch part, and spring means biasing the two clutch members into disengagement.

12. A scouring assembly according to claim 11, wherein said spring means between the two parts of said scouring device drive shaft has a heavier spring action than said spring means associated with the clutch members whereby upon an axial displacement of the drive shaft part mounting the scouring head toward the disposal device drive shaft first the clutch members engage each other and then the respective two drive shaft parts telescope into each other.

References Cited in the file of this patent

UNITED STATES PATENTS

| | | |
|---|---|---|
| 575,066 | Lippincott | Jan. 12, 1897 |
| 1,445,867 | Binder | Feb. 20, 1923 |
| 2,501,386 | Gibbs | Mar. 21, 1950 |
| 2,579,393 | Modrey | Dec. 18, 1951 |